Figure 1:
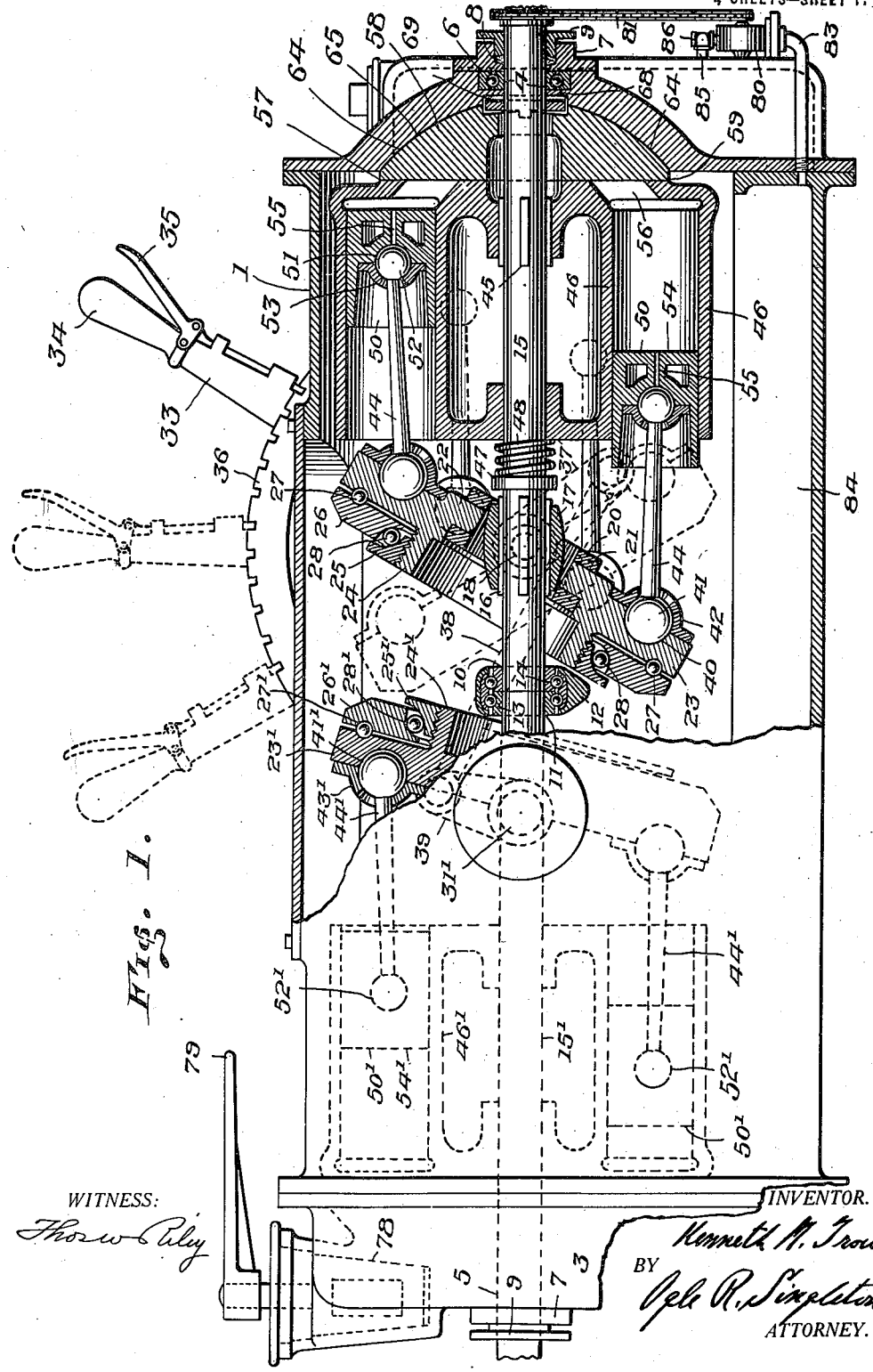

K. M. TROWBRIDGE.
VARIABLE SPEED CHANGE MECHANISM OF POWER-TRANSMISSION DEVICES.
APPLICATION FILED JAN. 27, 1919.

1,407,047. Patented Feb. 21, 1922.

4 SHEETS—SHEET 1.

WITNESS:

INVENTOR.

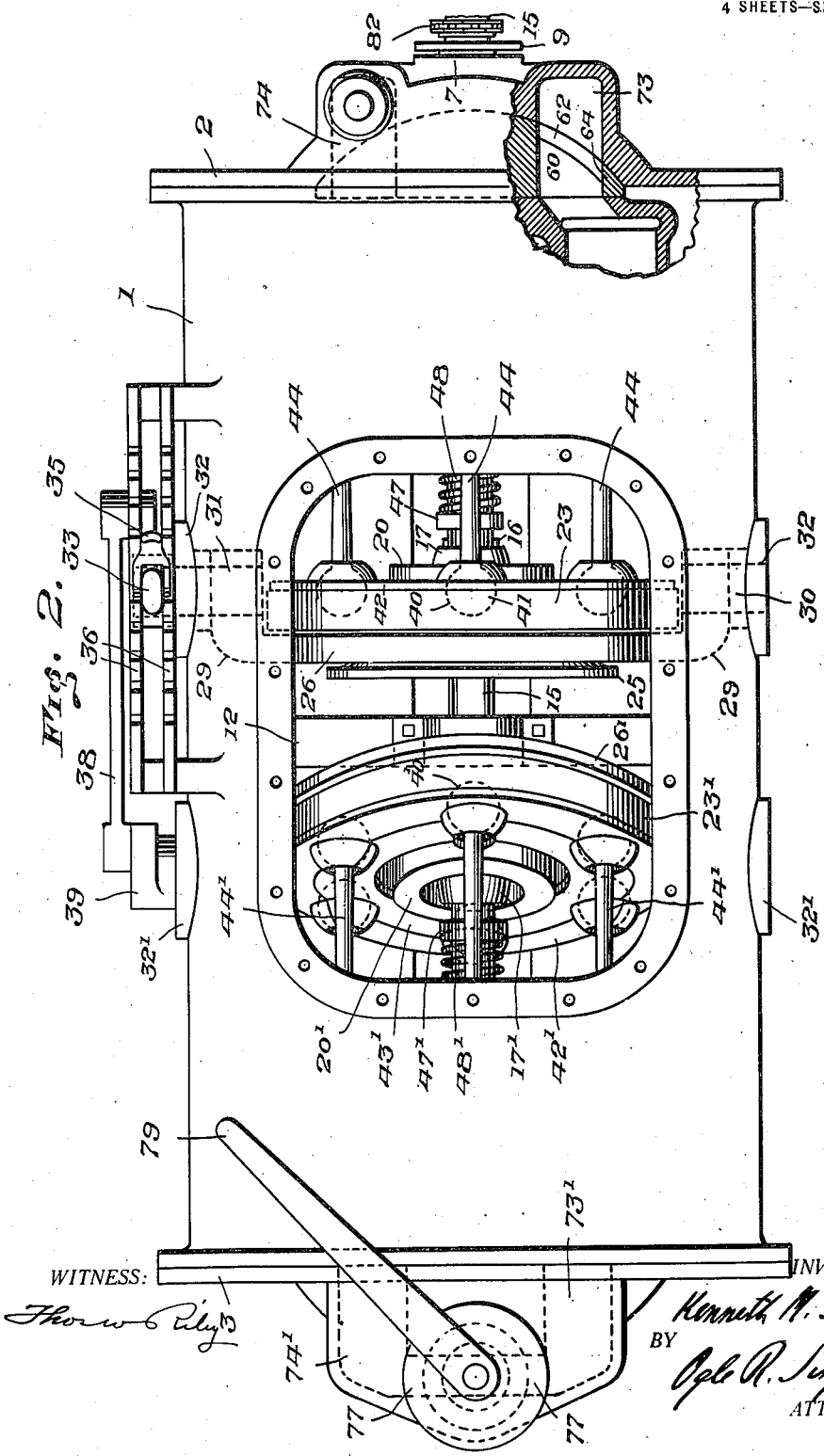

K. M. TROWBRIDGE.
VARIABLE SPEED CHANGE MECHANISM OF POWER TRANSMISSION DEVICES.
APPLICATION FILED JAN. 27, 1919.
1,407,047.
Patented Feb. 21, 1922.
4 SHEETS—SHEET 3.
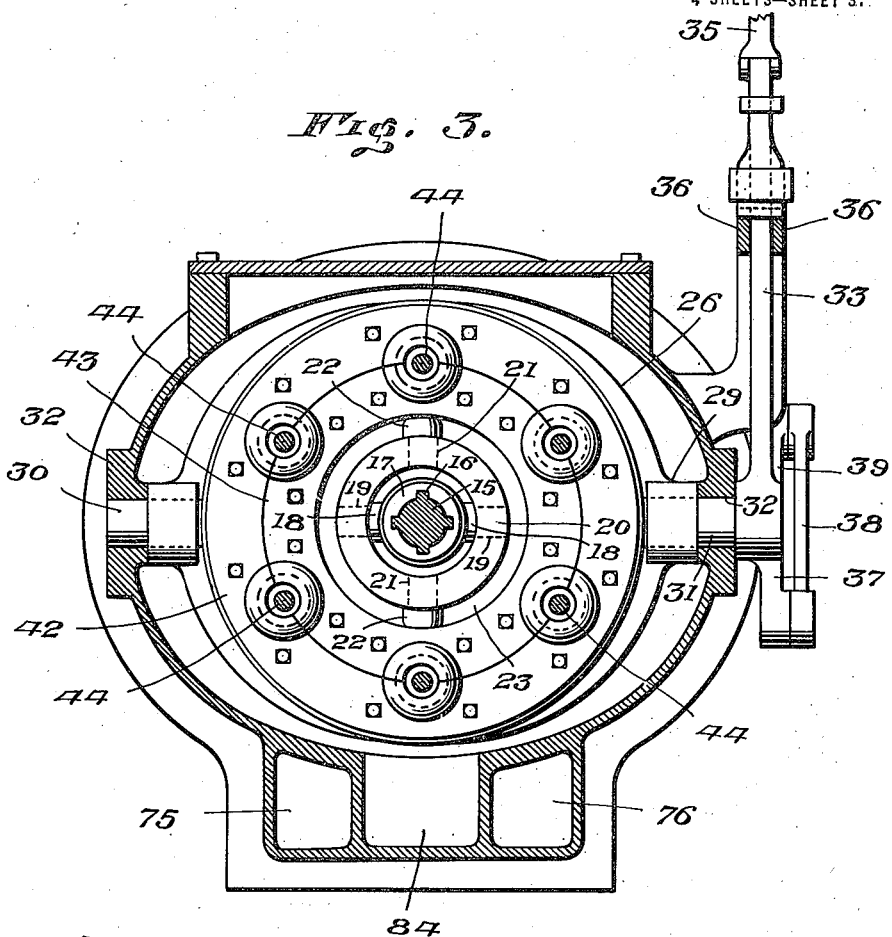
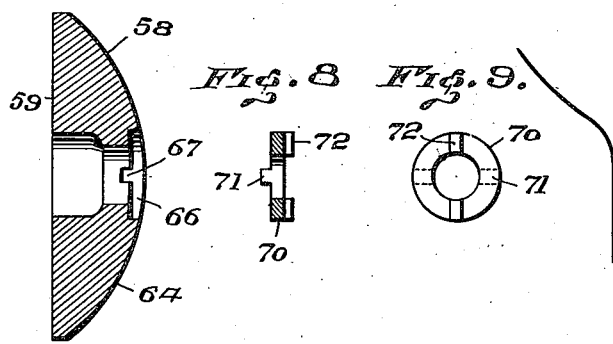
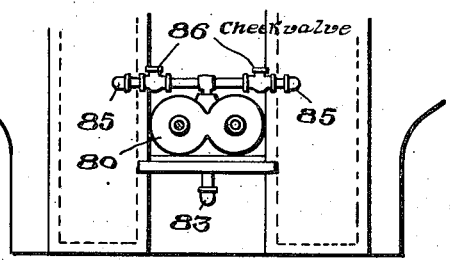
WITNESS:
INVENTOR.
Kenneth M. Trowbridge
BY
ATTORNEY.

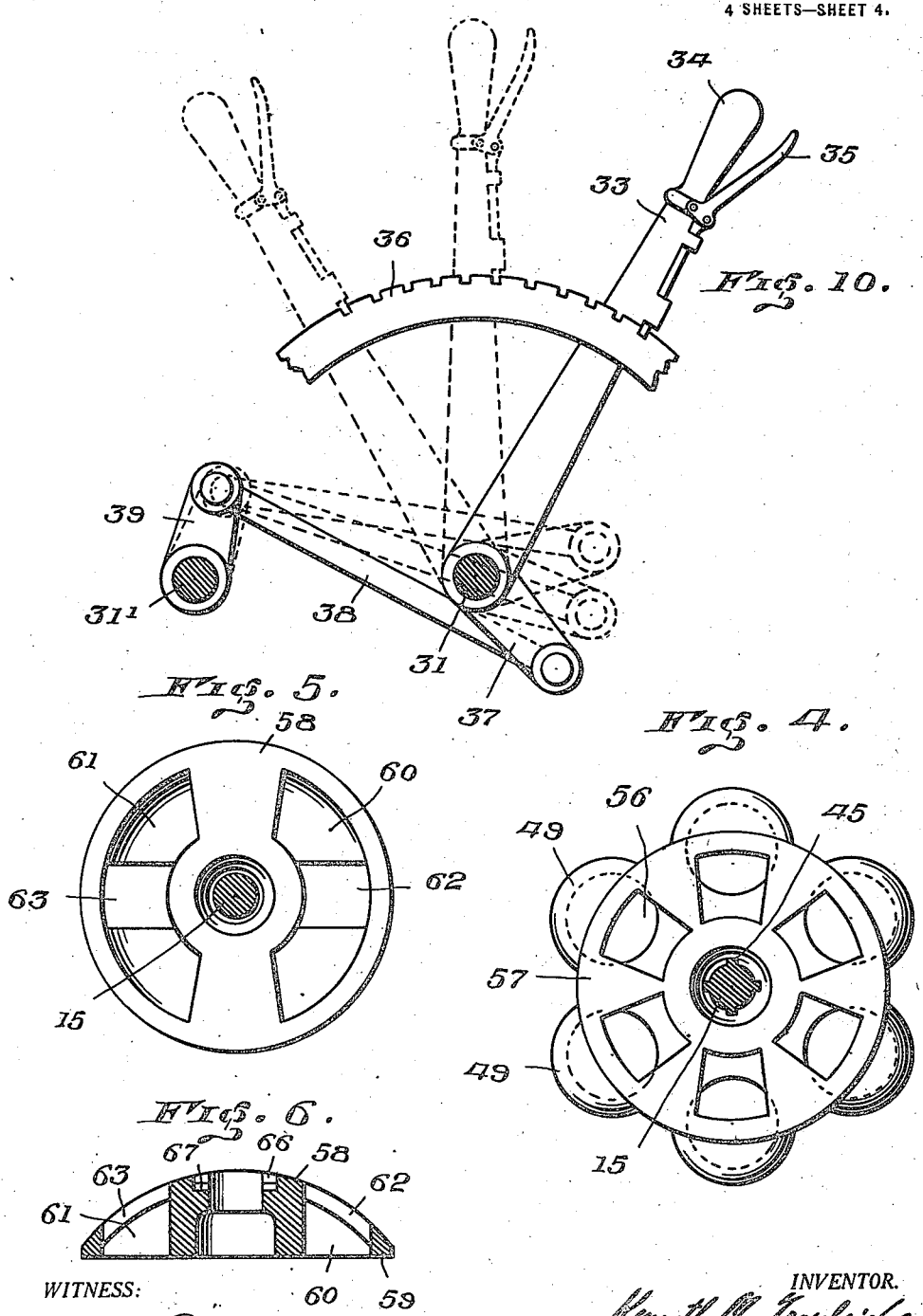

UNITED STATES PATENT OFFICE.

KENNETH M. TROWBRIDGE, OF DALLAS, GEORGIA.

VARIABLE-SPEED CHANGE MECHANISM OF POWER-TRANSMISSION DEVICES.

1,407,047. Specification of Letters Patent. Patented Feb. 21, 1922.

Application filed January 27, 1919. Serial No. 273,446.

*To all whom it may concern:*

Be it known that I, KENNETH M. TROWBRIDGE, a citizen of the United States, residing at Dallas, in the county of Paulding and State of Georgia, have invented certain new and useful Improvements in Variable-Speed Change Mechanism of Power-Transmission Devices, of which the following is a specification.

My invention consists in certain new and useful improvements in that class of power transmission devices, in which the transmission of power from the driving member to the driven member is secured by a liquid circulating system. These improvements are designed to secure more efficient operation of devices of this character, by increasing the flexibility of the circulating system, affording improved results in the transmission of power together with superior control of the device. While there have been many devices of this general character, appearing to be theoretically sound, the practical difficulties presented in the operation of these devices have thus far prevented their operative success, and it is to secure this operative success that my improvements have been applied to devices of this character. I have conceived and perfected a novel form of valve for use in controlling the flux of the liquid through the circulating system, which, being flexibly self-aligning, effectively overcomes the practical difficulties of loss of pressure through leakage of the fluid due to relative rigidity of the operative parts, which thus far has proven a fatal defect in such devices. I have conceived and embodied in my device a novel and effective relation of the part of the device propelling the liquid to the part of the device which is propelled by the liquid, together with a novel means of mechanical control automatically operative between the speed regulating means of the propelling member and the propelled member. I have embodied also an efficient control valve to perform the office of a clutch to alternatively render operative and inoperative the mechanism of the device. I have included in the efficiency improvements of my device, a novel means to maintain the requisite pressure in the circulating system, by the agency of an auxiliary pumping system operated by the ordinary type of gear pump. Experience in the operation of my device has demonstrated that the foregoing improvements supply the requisite elements for increasing the efficient performance of the device to such an extent as to secure results of an entirely practicable and satisfactory quality.

My invention is clearly and fully disclosed in the details of construction shown in the drawings and hereinafter described.

In the drawings:

Figure I is a side view of the device, partly in section.

Figure II is a top plan view of the device with a small portion broken away.

Figure III is a vertical section of the device.

Figure IV is a detail end elevation of a portion of the device.

Figure V is a detail end elevation of a portion of the device.

Figure VI is a horizontal section of a detail of the device.

Figure VII is a vertical section of a detail of the device.

Figure VIII is a vertical section of a detail of the device.

Figure IX is an end elevation of a detail.

Figure X is a side plan view of a detail.

Figure XI is an end plan view of a detail.

In the drawings:

The numeral 1 designates a casing which encloses the device, to which are secured the end covers 2 and 3. Located in the center of the covers 2 and 3 are the shaft bearings 4 and 5 which are provided with the ball bearings 6 and the stuffing boxes 7 having the stuffing 8 and the stuffing glands 9. In the center of the casing 1, are located the shaft bearings 10 and 11, mounted upon the transverse support 12, provided with the ball bearings 13 and 14. Carried in the bearings 4 and 10 is the shaft 15. Located upon the shaft 15, adjacent the bearing 10 are the keys 16, by means of which there is slidably mounted on the shaft 15, the collar 17, which is provided with the studs 18 which carry on the bearings 19, the collar 20 which has the bearings 21 in which are carried the studs 22 of the disc 23, which has a centrally disposed, threaded extension 24 to which is applied the threaded ring 25 by means of which the disc 23 is held in fixed relation to the disc 26, ball bearings 27 being interposed between the disc 23 and the disc 26 and ball bearings 28 being interposed between the ring 25 and the disc 26. The parts above described from the collar 17 to the disc 23 form a universal joint, hereafter referred to as "J." The disc 26 is provided with two shoulders 29, from one of which extends the stud 30 and from the other one of which extends the shaft 31. The stud 30 and the shaft 31 are carried in bearings 32, located in the opposite sides of the casing 1. The shaft 31 passing through the bearing 32, has on its end outside of the casing 1, the lever 33, which is provided with a handle 34 and a latch 35 adapted to operate in a latch quadrant 36. Extending from the lower end of the lever 33 is the bell crank 37 to which is attached the link 38, which is attached to the bell crank 39 which is mounted upon the end, outside of the casing 1, of the shaft 31'. Symmetrically disposed in the face of the disc 23, are six hemi-spherical sockets 40, in which are carried the spherical balls 41, being held in place by means of the cover plates 42 and 43. From the balls 41 extend rods 44. Located upon the shaft 15, adjacent the end cover 2, are the keys 45 by means of which there is slidably mounted on the shaft 15, the block of cylinders 46. A collar 47 fixed upon the shaft 15 and a coil spring 48 serve to hold the block of cylinders 46 in the proper position, as will be explained later. This block of cylinders 46 is composed of six symmetrically disposed cylinders 49, in each one of which is a piston 50, provided with a hemi-spherical socket 51 in which is carried a spherical ball 52, being held in place by a split cap 53. These balls 52 are connected with the rods 44 connected with the balls 41, thus forming double ball-and-socket connections through the rods 44 between the disc 23 and the pistons 50. From the face 54 of each piston 50, there is an oil channel 55 to the socket 51, for the purpose of lubricating. Each cylinder 49 is provided with a port 56 opening through the face 57 of the block of cylinders 46. Surrounding the shaft 15 and within the end cover 2, is located the valve member 58, having its face 59 in contact with the face 57 of the block of cylinders 46, this contact being maintained by the action of the spring 48. The valve member 58, is provided with two radial ports 60 and 61, each having an area slightly less than the area of the least number of pistons, 50, communicative with it at one time. Communicating with the ports 60 and 61 are the openings 62 and 63, through the face 64 of the valve member 58. The face 64 is covered by the face 65 of the end cover 2. Immediately surrounding the shaft 15, in the face 64, there is a circular inset 66 provided, at points in line, with a horizontal diameter of the shaft 15 with key seats 67. Immediately surrounding the shaft 15, in the face 65, there is a circular inset 68, provided, at points in line, with a vertical diameter of the shaft 15, with key seats 69. Located within the insets 66 and 68, is the key ring 70, provided with the horizontally disposed keys 71, adapted to engage the key seat 67, and the vertically disposed keys 72, adapted to engage the key seats 69. The foregoing elements constitute a universal joint between the valve member 58 and the end cover 2, hereafter referred to as "J²." This universal joint "J²" makes it possible for the valve member 58 to oscillate in any direction about the axis of the shaft 15, while it is held against rotation with the shaft 15, so that the valve member 58 is self-aligning, permitting the face 59 to be in constant contact with the face 57. The end cover 2 is provided with two passages 73 and 74 adapted to register with the openings 62 and 63 in the valve member 58. These channels extend downwardly through the end cover 2 and communicate with the cross passages 75 and 76, respectively, which connect the end covers 2 and 3. Carried in the bearings 5 and 11, is the shaft 15'. The elements designated by the numerals 16 and 32, both inclusive, are duplicated by elements designated by the numerals 16' to 32', both inclusive, which bear the same relation to the shaft 15' as the former set of elements do to the shaft 15. The elements designated by the numerals 40 to 74, both inclusive, are duplicated by elements designated by the numerals 40' to 74', both inclusive. Connecting the channels 73' and 74' is the by-pass 77, provided with plug valve 78, having the operating handle 79. Located adjacent the end cover 2, is the gear pump 80, which is operated by the gear chain 81 with the gear wheel 82 mounted upon the shaft 15. The gear pump 80 has a supply pipe 83 which is connected with the oil well 84 located in the base of the casing 1. Supply pipes 85, from the gear pump 80, are connected with the passages 73 and 74 in the end cover 2. Each supply pipe 85 is provided with a check valve 86.

*Operation.*

From the foregoing description of the details of construction of my device, its operation is readily apparent. The parts being as indicated in Figure 2, the driven shaft 15 is actuated by the motive power applied thereto. The revolution of the shaft 15 actuates the gear pump 80, which draws oil from the oil well 84 through the pipe 83 and supplies it, through the pipes 85, to the passages 73 and 74, thus filling the circulating system of the device. When the required pressure in the system has been thus secured, the check valves 86, responding to this pressure, close the pipes 85 and thus cut off the circulating system from the gear pump 80 and the pipe 83. Should the pressure in the system fall below the pressure exerted by the gear pump 80, the valves 86 will open and permit the gear pump 80 to restore the required pressure in the system. The lever 33 is moved to a point on the latch quadrant 36 in the direction of the end cover 2, fixing the device for any desired degree of speed forward. Through the movement of the lever 33, the parts connected therewith, namely, the disc 26 and the related disc 23 are oscillated in the bearings 32 from a perpendicular position to an oblique position. The disc 23 being revolved by the action of the shaft 15, through the connection of the universal joint "J," causes the piston rods 44 with their pistons 50 to reciprocate in the cylinders 49. The relation of the parts is such that this reciprocation of the pistons in the cylinders, causes the oil to flow from the passage 74 through the opening 63 and the port 61 of the valve 58 into the cylinders 49 as they sink, passing the port 61. As each cylinder 49 passes the portion of the valve 58 on its lower half between the ports 61 and 60, the valve 58 serves to retain a full charge of oil in the cylinder. The further revolution of the cylinders 49 serves to discharge the oil through the port 60 and the opening 62 in the valve 58 and so into the passage 73, whence the oil is propelled through the cross passage 75 to the passage 73' where the oil is forced through the opening 62' and the port 60' of the valve 58' filling the cylinders 49' adjacent the port 60', thereby expelling the pistons 50'. The reciprocation of the pistons 50' results in the revolution of the disc 23' through a process the reverse of that occurring between the disc 23 and the pistons 50, for the reasons that when the lever 33 is set in the desired position, through the bell crank 37, the link 38, the bell crank 39, and the shaft 31', the disc 23' is held in an oblique position such that the expulsion of the pistons 50' on the side of the device adjacent the passage 73' would cause the disc 23' to revolve in a direction similar to the revolution of the disc 23. This revolution of the disc 23', through the universal joint "J" causes the revolution of the driving shaft 15'. When the cylinders 49' pass that portion of the valve 58' located at the top of the valve and between the ports 61' and 62', the valve 58' serves to retain the charge of oil in the cylinders. The further revolution of the cylinders 49' caused by the revolution of the shaft 15' to which they are keyed reciprocates the pistons 50' so as to discharge oil through the port 61' and the opening 63' into the passage 74', whence it flows through the cross passage 76 to the passage 74 where it supplies oil to the cylinders 49 as explained above. The relation of the disc 23 to the disc 23' is such that when the movement of the lever 33 positions the disc 23 to cause the pistons 50 to reciprocate through the shortest distance of their thrust, the disc 23' is positioned to cause the pistons 50' to reciprocate through the longest distance of their thrust. It will be evident that the effect of this is to provide a relation of the propelling member to the propelled member of such character that when the propelling member is positioned to assume the initial movement, the propelled member is positioned to exert the maximum effort, i. e. minimum speed and maximum torque. Moreover, the relation of the disc 23 to the disc 23' is such that when the disk 23 is positioned to cause the pistons 50 to reciprocate through the longest distance of their thrust, the disc 23' is positioned to cause the pistons 50' to reciprocate through the shortest distance of their thrust. The effect of this arrangement is to provide a relation of the propelling member to the propelled member of such character that when the propelling member is positioned to exert the minimum pressure, i. e. pump the maximum quantity of liquid, the propelled member is positioned to operate at maximum speed. The foregoing description of the operations applies to the operation of the device for direct forward driving. The movement of the lever 33 to a point on the latch quadrant 36 in the direction of the end cover 3 will cause the positioning of the disc 23 so as to reverse the relation of the pistons 50 in the cylinders 49 from their positions when the lever 33 is set as formerly indicated. This will result in reversing the flow of oil in the circulating system with the consequent reversal of the operation of the propelled member with the result that the driving shaft 15' will operate in reverse. The valve 58 having oscillation in any direction about the axis of the shaft 15, because of the universal joint "J²," is adapted to be in constant contact with the face 57 of the block of cylinders 46, thereby eliminating leakage from the circulating system, at the point where leakage is most liable to occur, namely, the point of contact between the fixed member and the revolving member. This constant contact is secured by the slidable mounting of the block of cylinders 46 upon the shaft 15 and the action of the collar 47 and the spring 48. The identical construction of the valve 58' and its related elements serves the same purpose in the propelled member of my device. The operation of the by-pass 77 with the plug valve 78 will be readily understood to constitute a clutch. By the opening of this by-pass 77 by the operation of the plug valve 78 by means of the handle 79, the flow of oil from the passage 73' to the passage 74' is permitted, so that the oil pressure is relieved from the cylinders 49' and the pistons 50' so that the operation of the disc 23' and the shaft 15' is interrupted, while the propelling member continues to operate. Conversely the closing of this by-pass 77, restores the oil pressure exerted by the propelling member to the propelled member and causes it to renew operation.

Having described my invention, what I claim is:

1. In a variable speed change mechanism, the combination of a driven shaft; a driving shaft; a liquid circulating system; a pump actuated by the driven shaft and adapted to induce the circulation of the liquid; an engine actuated by the circulation of the liquid and adapted to actuate the driving shaft; a control lever adapted to change the relation of the operative parts of the pump; and a positive mechanical connection between said lever and the engine, actuated by the operation of the control lever and adapted to change the relation of the operative parts of the engine in relation to the adjustment of the pump, said lever and its connection being so related that its operation is adapted to adjust the pump and engine in relation to each other so as to secure an inverse ratio of their production and consumption.

2. The combination of a driven shaft; a liquid circulating system; a rotary element actuated by said shaft and adapted to induce the circulation of the liquid in said system; and a non-rotatable valve member surrounding the shaft and capable of oscillation in any direction about the axis of the shaft, and adapted to control the operation of said rotary element.

3. The combination of a driven shaft; a liquid circulating system; a rotary element actuated by said shaft and adapted to induce the circulation of the liquid in said system; and a non-rotatable valve member surrounding the shaft and capable of oscillation in any direction about the axis of the shaft, and adapted to be held in constant contact with said rotary element, and to control the operation of said rotary element.

4. The combination of a driven shaft; a liquid circulating system; a rotary element actuated by said shaft and adapted to induce the circulation of the liquid in said system; a non-rotatable valve member surrounding the shaft and capable of oscillation in any direction about the axis of the shaft, and adapted to control the operation of said rotary element; and means adapted to hold the rotary element and the non-rotatable member in constant contact.

5. The combination of a driven shaft; a liquid circulating system; a propelling member adapted to induce the circulation of the liquid and provided with a cylindrical block of cylinders upon the driven shaft; and a non-rotatable valve member, surrounding the driven shaft, capable of oscillation in any direction about the axis of the driven shaft and adapted to control the charging and discharging of the liquid into and out of the cylinders of the propelling member.

6. The combination of a driven shaft; a liquid circulating system; a propelling member adapted to induce the circulation of the liquid and provided with a cylindrical block of cylinders upon the driven shaft; a non-rotatable valve member, surrounding the driven shaft, capable of oscillation in any direction about the axis of the driven shaft and adapted to control the charging and discharging of the liquid into and out of the cylinders of the propelling member; and means adapted to hold the block and valve member in constant contact.

7. In a variable speed change mechanism, the combination of a driven shaft; a driving shaft; a liquid circulating system; a propelling member adapted to induce the circulation of the liquid; a propelled member, identical in structure with the propelling member, adapted to be actuated by the circulation of the liquid; a rotary element of the propelling member, slidably mounted for rotation upon the driven shaft; a non-rotatable plate surrounding the driven shaft, capable of oscillation in any direction about the axis of the driven shaft and adapted to be held in constant contact with the face of the rotatable slidable member mounted upon the driven shaft; a rotary element of the propelled member, slidably mounted for rotation upon the driving shaft; and a non-rotatable plate surrounding the driving shaft, capable of oscillation in any direction about the axis of the driving shaft and adapted to be held in constant contact with the face of the rotatable slidable member mounted upon the driving shaft.

8. In a variable speed change mechanism, the combination of a driven shaft; a driving shaft; a liquid circulating system; a propelling member adapted to induce the circulation of the liquid; a propelled member, identical in structure with the propelling member, adapted to be actuated by the circulation of the liquid; a by-pass adapted to interrupt the actuation of the propelled member; a rotary element of the propelling member, slidably mounted for rotation upon the driven shaft; a non-rotatable plate surrounding the driven shaft, capable of oscillation in any direction about the axis of the driven shaft and adapted to be held in constant contact with the face of the rotatable slidable member mounted upon the driven shaft; a rotary element of the propelled member, slidably mounted for rotation upon the driving shaft; and a non-rotatable plate surrounding the driving shaft, capable of oscillation in any direction about the axis of the driving shaft and adapted to be held in constant contact with the face of the rotatable slidable member mounted upon the driving shaft.

9. In a variable speed change mechanism, the combination of a driven shaft;

a driving shaft; a liquid circulating system; a propelling member adapted to induce the circulation of the liquid; a propelled member, identical in structure with the propelling member, adapted to be actuated by the circulation of the liquid; a non-rotatable plate surrounding the driven shaft, capable of oscillation in any direction about the axis of the driven shaft; a resilient member interposed between the propelling member and the driven shaft and adapted to form a leak-proof contact between the propelling member and the non-rotatable plate; a non-rotatable plate surrounding the driving shaft, capable of oscillation in any direction about the axis of the driving shaft; and a resilient member interposed between the propelled member and the driving shaft and adapted to form a leak-proof contact between the propelled member and the non-rotatable plate.

10. In a variable speed change mechanism, the combination of a driven shaft; a driving shaft; a liquid circulating system; a propelling member adapted to induce the circulation of the liquid; a propelled member, identical in structure with the propelling member, adapted to be actuated by the circulation of the liquid; a by-pass adapted to interrupt the actuation of the propelled member; a non-rotatable plate surrounding the driven shaft, capable of oscillation in any direction about the axis of the driven shaft; a resilient member interposed between the propelling member and the driven shaft and adapted to form a leak-proof contact between the propelling member and the non-rotatable plate; a non-rotatable plate surrounding the driving shaft, capable of oscillation in any direction about the axis of the driving shaft; and a resilient member interposed between the propelled member and the driving shaft and adapted to form a leak-proof contact between the propelled member and the non-rotatable plate.

11. In a variable speed change mechanism, the combination of a driven shaft; a driving shaft; a liquid circulating system; a propelling member adapted to induce the circulation of the liquid; a propelled member, identical in structure with the propelling member, adapted to be actuated by the circulation of the liquid; a non-rotatable plate surrounding the driven shaft, capable of oscillation in any direction about the axis of the driven shaft; means adapted to form a leak-proof contact between the propelling member and the non-rotatable plate; a non-rotatable plate surrounding the driving shaft, capable of oscillation in any direction about the axis of the driving shaft; means adapted to form a leak-proof contact between the propelled member and the non-rotatable plate.

12. In a variable speed change mechanism, the combination of a driven shaft; a driving shaft; a liquid circulating system; a propelling member adapted to induce the circulation of the liquid and provided with a cylindrical block of cylinders slidably mounted for rotation upon the driven shaft; a non-rotatable valve member, surrounding the driven shaft, capable of oscillation in any direction about the axis of the driven shaft and adapted to control the charging and discharging of the liquid into and out of the cylinders of the propelling member; a propelled member, identical in structure with the propelling member, adapted to be actuated by the circulation of the liquid and provided with a cylindrical block of cylinders slidably mounted upon the driving shaft; and a non-rotatable valve member, surrounding the driving shaft, capable of oscillation in any direction about the axis of the driving shaft, and adapted to control the charging and discharging of the liquid into and out of the cylinders of the propelled member.

13. In a variable speed change mechanism, the combination of a driven shaft; a driving shaft; a liquid circulating system; a propelling member adapted to induce the circulation of the liquid and provided with a cylindrical block of cylinders slidably mounted for rotation upon the driven shaft; a non-rotatable valve member surrounding the driven shaft, capable of oscillation in any direction about the axis of the driven shaft, and adapted to control the charging and discharging of the liquid into and out of the cylinders of the propelling member; a resilient member interposed between the driven shaft and the block of cylinders, adapted to secure a leak-proof contact between the block of cylinders and the valve member; a propelled member, identical in structure with the propelling member, adapted to be actuated by the circulation of the liquid, and provided with a cylindrical block of cylinders slidably mounted for rotation upon the driving shaft; a non-rotatable valve member surrounding the driving shaft, capable of oscillation in any direction about the axis of the driving shaft, and adapted to control the charging and discharging of the liquid into and out of the cylinders of the propelled member; and a resilient member interposed between the driving shaft and the block of cylinders, adapted to secure a leak-proof contact between the block of cylinders and the valve member.

14. In a variable speed change mechanism, the combination of a driven shaft; a driving shaft; a liquid circulating system; a propelling member adapted to induce the circulation of the liquid and provided with a cylindrical block of cylinders slidably mounted for rotation upon the driven shaft;

a non-rotatable valve member surrounding the driven shaft, capable of oscillation in any direction about the axis of the driven shaft, and adapted to control the charging and discharging of the liquid into and out of the cylinders of the propelling member; means adapted to secure a leak-proof contact between the block of cylinders and the valve member; a propelled member, identical in structure with the propelling member, adapted to be actuated by the circulation of the liquid, and provided with a cylindrical block of cylinders slidably mounted for rotation upon the driving shaft; a non-rotatable valve member surrounding the driving shaft, capable of oscillation in any direction about the axis of the driving shaft, and adapted to control the charging and discharging of the liquid into and out of the cylinders of the propelled member; and means adapted to secure a leak-proof contact between the block of cylinders and the valve member.

15. In a variable speed change mechanism, the combination of a driven shaft; a driving shaft; a liquid circulating system; means operated by the driven shaft to induce the flow of liquid in the circulating system; means actuated by said flow to actuate the driving shaft; means to render alternatively operative and inoperative the said flow actuated means; means adapted to maintain the requisite degree of pressure in both the flow inducing and flow actuated means regardless of the direction of the flow; means adapted to change the relation of the parts of the flow inducing means and to change the relation of the parts of the flow actuated means to adjust the flow inducing means and the flow actuated means in relation to each other so as to secure an inverse ratio of their action; a rotary element of the flow inducing means slidably mounted for rotation upon the driven shaft; a non-rotatable plate surrounding the driven shaft, capable of oscillation in any direction about the axis of the driven shaft and adapted to be held in constant contact with the face of the rotatable slidable element mounted upon the driven shaft; a rotary element of the flow actuated means, slidably mounted for rotation upon the driving shaft; and a non-rotatable plate surrounding the driving shaft, capable of oscillation in any direction about the axis of the driving shaft and adapted to be held in constant contact with the face of the rotatable slidable member mounted upon the driving shaft.

16. In a variable speed change mechanism, the combination of a driven shaft; a driving shaft; a liquid circulating system; means operated by the driven shaft to induce the flow of liquid in the circulating system; means actuated by said flow to actuate the driving shaft; means to render alternatively operative and inoperative the said flow actuated means; means adapted to change the relation of the parts of the flow inducing means and to change the relation of the parts of the flow actuated means to adjust the flow inducing means and the flow actuated means in relation to each other so as to secure an inverse ratio of their action; a rotary element of the flow inducing means slidably mounted for rotation upon the driven shaft; a non-rotatable plate surrounding the driven shaft capable of oscillation in any direction about the axis of the driven shaft and means adapted to hold the rotary element and the non-rotatable plate in constant contact; a rotary element of the flow actuated means, slidably mounted for rotation upon the driving shaft; and a non-rotatable plate surrounding the driving shaft, capable of oscillation in any direction about the axis of the driving shaft and means adapted to hold the rotary element and the non-rotatable plate in constant contact.

In testimony whereof I affix my signature in the presence of two witnesses.

KENNETH M. TROWBRIDGE.

Witnesses:
ALFRED E. MOYLE,
GEO. H. GILLON.